UNITED STATES PATENT OFFICE.

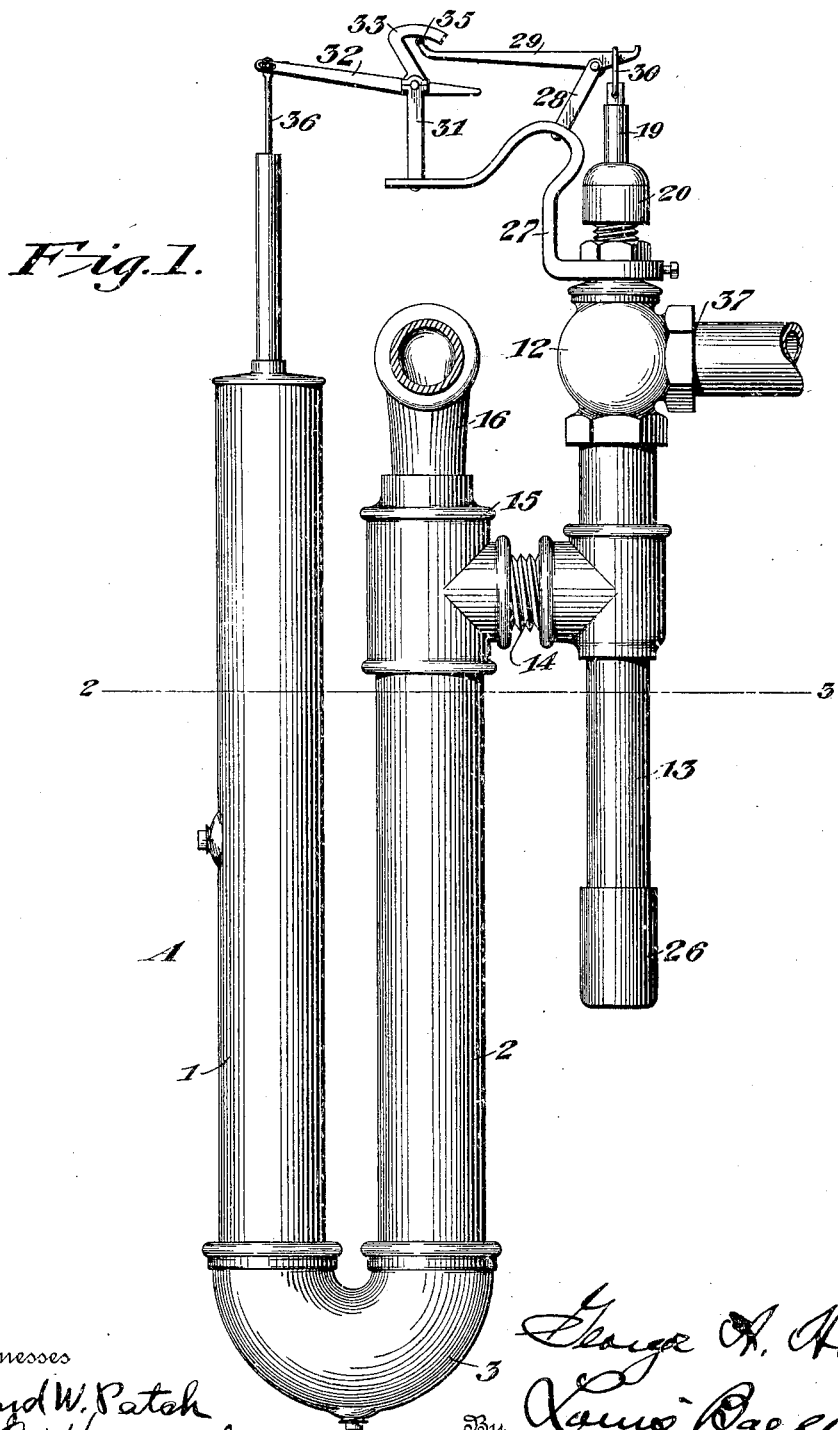

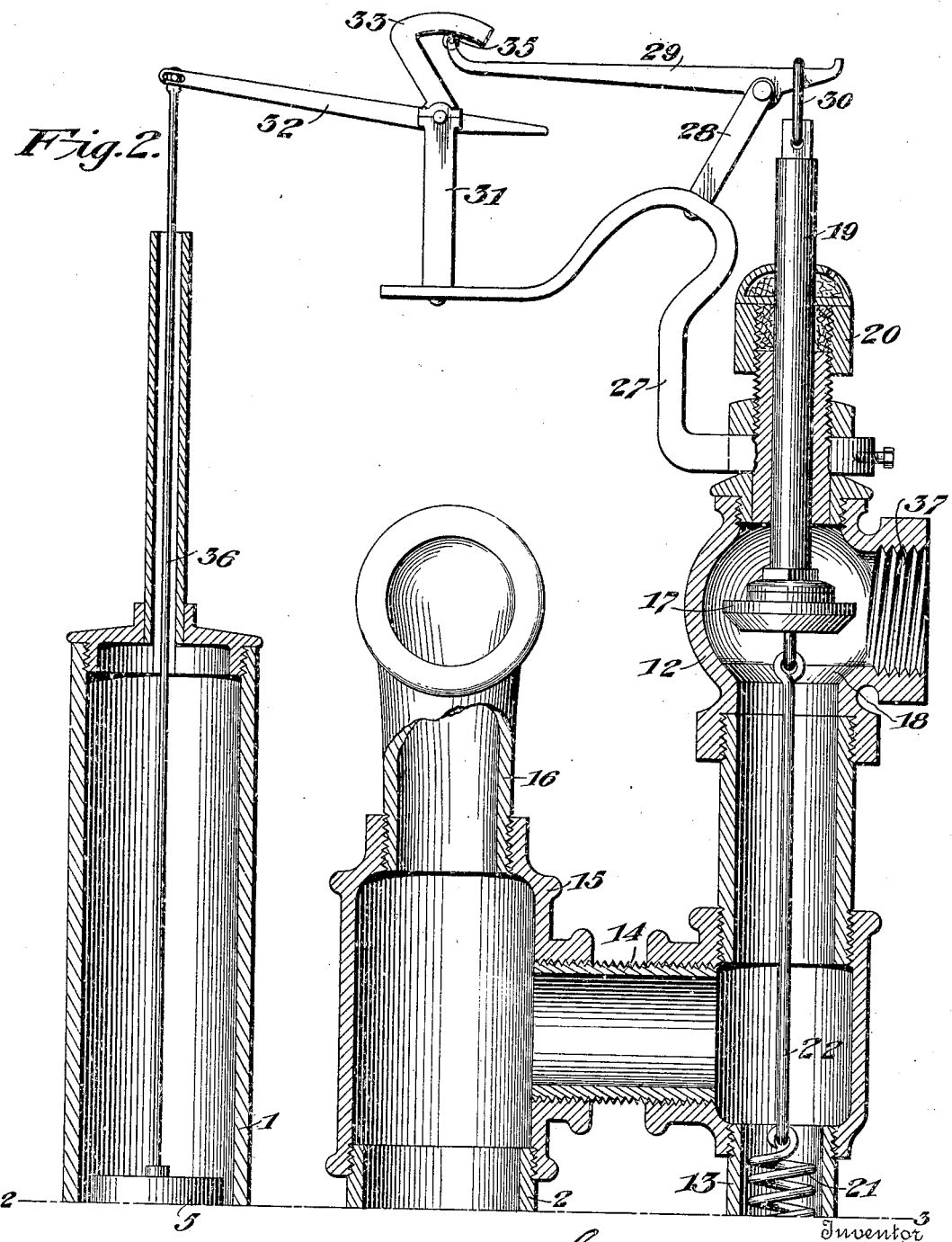

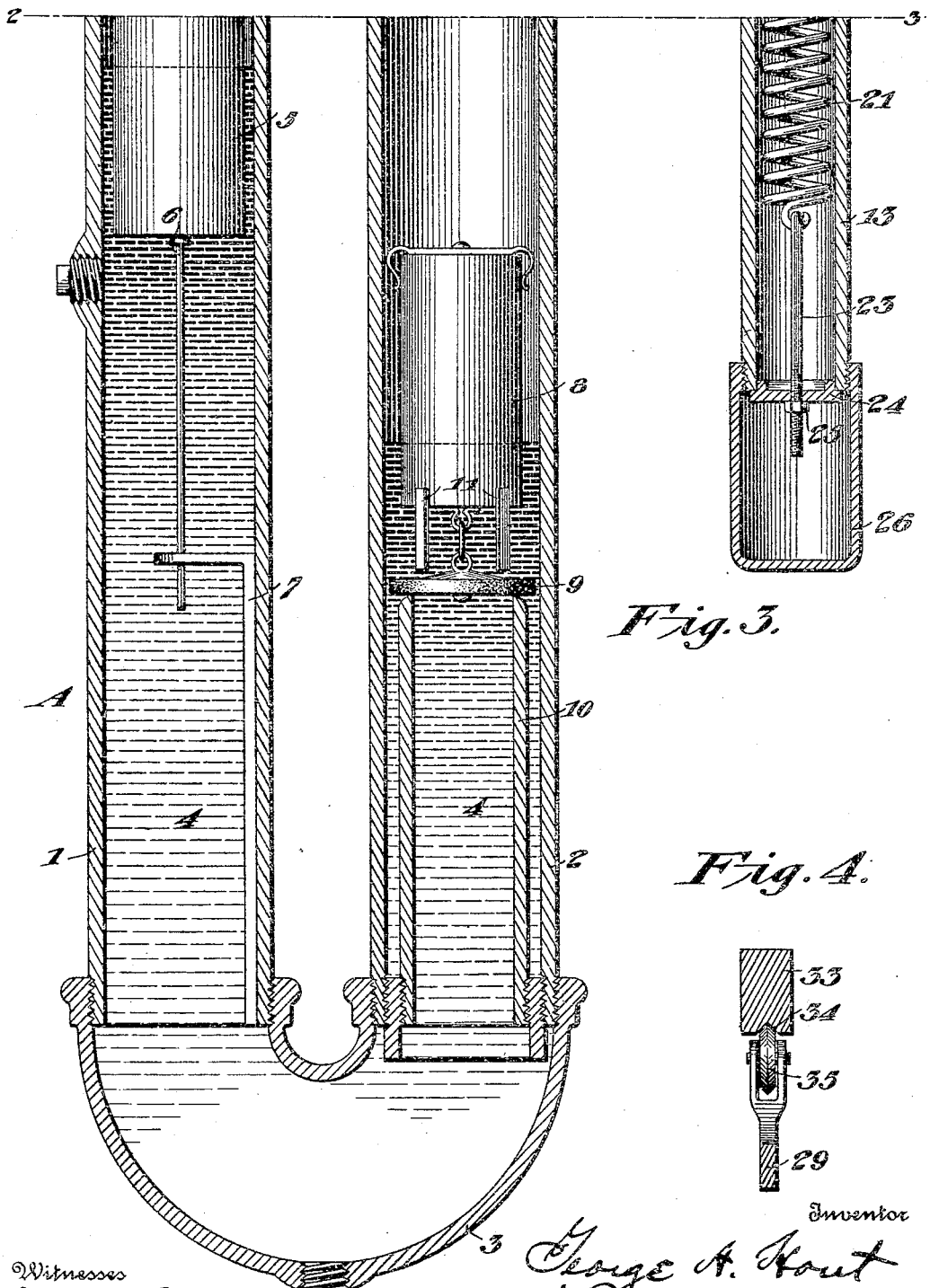

GEORGE A. HOUT, OF CRESTLINE, OHIO.

GAS-REGULATOR.

962,959.  Specification of Letters Patent.  Patented June 28, 1910.

Application filed March 12, 1910. Serial No. 548,870.

*To all whom it may concern:*

Be it known that I, GEORGE A. HOUT, a citizen of the United States, residing at Crestline, in the county of Crawford and State of Ohio, have invented certain new and useful Improvements in Gas-Regulators, of which the following is a specification.

My invention relates to an improvement in gas regulators, and the object is to provide means whereby the gas will be automatically shut off when the pressure in the pipe decreases.

The most trouble that is encountered in the use of natural gas is, that the pressure rises and falls very suddenly, and it is to overcome this objection of having the gas diminish in pressure to such an extent that there is danger of causing the lights to be extinguished, and then to have the pressure of the gas suddenly rise and allow it to escape into the room, that this invention has been devised.

The invention consists of a suitable valve which is normally held open by a tripping mechanism, which tripping mechanism is caused to be operated as the pressure or flow of gas decreases, and the invention further consists of certain novel features of construction and combinations of parts which will be hereinafter fully described and pointed out in the claims In the accompanying drawings:—Figure 1 is a view in elevation of the invention; Fig. 2 is a vertical sectional view from the line 2—3 through the upper portion of the structure; Fig. 3 is a vertical sectional view from the line 2—3 through the lower portion of the invention; and Fig. 4 is a detail view of the roller bearing on the lever which engages an end of another lever.

A represents a casing for the floats, which consists preferably of a U-shaped structure. The casing is composed of two parallel tubes or pipes 1 and 2, which are connected at their lower ends by a coupling 3. Received within the two pipes or tubes is a quantity of oil, or liquid, 4. A float 5 is mounted in the tube 1, and is guided in its movements in the tube by means of a stem 6, which passes through a bracket 7, connected to the wall of the tube 1. The controlling or regulating float 8 is mounted in the tube 2, and has connected to the lower end thereof a valve or stopper 9, which is adapted to normally rest upon the tubular extension 10 which is mounted in the lower end of the tube 2. The regulating float 8 is provided with legs 11 for controlling the position of the stopper 9. A valve casing 12 is provided with a tubular extension 13, which is connected by a pipe 14 with a coupling 15, which is connected to the tube 2, and connected to the coupling 15 is the gas supply pipe 16.

A valve 17 is received in the valve casing 12, and a valve seat 18 is formed in the casing for the valve 17. A valve stem 19 of the valve 17 passes through the upper end of the valve casing through a suitable stuffing box 20, and connected to the lower side of the valve 17 is a helical spring 21 by means of rod 22, and connected to the lower end of the spring is a rod 23 which is connected to a cap 24 by a nut 25 which is received upon the rod 23, the cap 24 bearing against the lower end of the tubular extension 13, and a hood 26 being provided for inclosing the lower end of the rod 23 and the cap 24. A bracket 27 is mounted upon the valve casing 12, and mounted upon the bracket is a post 28. Pivotally mounted upon the post 28 is a lever 29, one end of which is adapted to be received in a ring 30 which is connected to the valve stem 19.

A standard 31 is mounted upon the bracket 27, and pivotally mounted upon the standard is a lever 32 which is provided with an integral hook 33, which is preferably formed at the pivotal point of the lever 32. The under side or face of the hook 33 is provided with a groove 34, as shown in Fig. 4, in which is adapted to be received a roller bearing 35 of the lever 29. The lever 32 is connected to the float 5 by means of a rod 36.

When the gas is under proper pressure or of sufficient pressure to keep the controlling or regulating float 8 in a lowered position, so that the stopper 9 will be seated upon the tubular member 10, the oil or liquid within the pipes 1 and 2 will be prevented from rising in the pipe 2, thereby holding the float 5 in the pipe 1 at a sufficient height to prevent the tripping or movement of the lever 32. If the pressure of the gas should diminish to such an extent as to allow the float 8 to rise in the pipe 2, the liquid would be immediately allowed to enter the pipe 2 as the stopper 9 would be raised from the valve seat 10, causing the float 5 to fall in the tube 1, causing the rod 36 to be drawn into the tube, which action would cause the lever 32 to be moved upon its pivot on the post, and on the standard 31, causing the hook 33 to become disengaged with the end of the lever 29. The disengagement of the lever 29 with the hook 33 of the lever 32, would cause the lever 29 to be moved upwardly on its pivot on the post 28, thereby releasing the valve stem 19, and allowing the valve 17 to be seated on the valve seat 18, thereby preventing the flow of gas through the valve casing and through the outlet opening 37. The spring 29 will cause the valve 17 to remain seated after the tripping action has occurred, and the flow of gas through the valve casing to be interrupted until the valve stem is raised, and the connection made between the valve stem and the lever 29, and the connection between the lever 29 and the lever 32.

Having fully described my invention, what I claim as new and desire to secure by Letters Patent, is:—

1. In a gas regulator, the combination with a casing having a liquid therein, of a valve casing connected to the casing, a valve in the valve casing, a tripping mechanism connected to the valve, a float connected to the tripping mechanism received in the casing, means for admitting gas to the casings, which gas is adapted to act upon the liquid for causing the float to be held at an elevation for holding the valve in an open position to permit the passage of gas through the valve casing, and a float-controlled stopper received in the casing, acting as a stop to limit the action of the liquid upon the float.

2. In a gas regulator, the combination with a casing having liquid therein, a valve seat in the casing, a stopper adapted to be seated on the valve seat, of a valve casing connected to the casing, a valve in the valve casing, a tripping mechanism connected to the valve, a float in the casing connected to the tripping mechanism, and means for admitting gas to the casing, which gas is adapted to act upon the liquid for holding the float at an elevation for causing the valve in the valve casing to be held in an open position to permit the flow of gas through the valve casing, said stopper adapted to be seated upon the valve seat in the casing when the float is raised to limit the action of the liquid upon the float.

3. In a gas regulator, the combination with a U-shaped casing having liquid therein, of a float mounted in the casing, a valve casing connected to the casing, a valve in the valve casing, a tripping mechanism connected to the valve and float, means for admitting gas to the first named casing, which gas is adapted to act upon the liquid for causing the float to be held at an elevation, whereby the valve in the valve casing will be held in an open position to allow the discharge of gas through the valve casing, and a float-controlled stopper mounted in the casing for limiting the action of the liquid upon the float.

4. In a gas regulator, the combination with a casing having liquid therein, of a float mounted in the casing, means for admitting gas to the casing, which gas is adapted to act upon the liquid for causing the float to be held at an elevation, a stopper in the casing for limiting the action of the liquid upon the float, a valve casing connected to the casing, a valve in the valve casing, and means connecting the valve to the float whereby the valve is held in an open position during the discharge of gas through the valve casing.

5. In a gas regulator, the combination with a casing having liquid therein, of a float mounted in the casing, means for admitting gas to the casing, which gas is adapted to act upon the liquid for causing the float to be held at an elevation, a valve casing connected to the casing, a valve controlling the discharge of gas from the valve casing, a bracket, a lever pivotally mounted on the bracket, means connecting the lever and valve, a secondary lever engaging said lever, means connecting the float and secondary lever whereby the valve in the valve casing is held in an open position to allow the discharge of gas from the casing, and a stopper in the casing adapted to limit the action of the liquid upon the float.

6. In a gas regulator, the combination with a casing having liquid therein, of a float mounted in the casing, means for admitting gas to the casing, which gas is adapted to act upon the liquid for holding the float at an elevation, a stopper in the casing adapted to limit the action of the liquid upon the float, a valve casing connected to the casing, a valve for controlling the discharge of gas from the valve casing, a bracket, a lever pivotally mounted on the bracket, means connecting the lever and valve, a secondary lever having a hooked end, said hooked end of the lever adapted to engage the first named lever, and means connecting the secondary lever to the float whereby the valve is held in an open position when the float is at its elevated position.

In testimony whereof I affix my signature, in the presence of two witnesses.

GEORGE A. HOUT.

Witnesses:
 THOMAS BENTON JARVIS,
 EDWARD LAZELLE MILLER.